July 18, 1939. L. A. HAZELTINE Re. 21,153

FREQUENCY CONVERSION SYSTEM

Original Filed Jan. 31, 1936 4 Sheets-Sheet 1

INVENTOR.
LOUIS A. HAZELTINE,
BY Laurence B. Dodds
ATTORNEY.

FREQUENCY CONVERSION SYSTEM

Original Filed Jan. 31, 1936 4 Sheets-Sheet 2

INVENTOR.
LOUIS A. HAZELTINE,

BY Laurence B. Dodds

ATTORNEY.

FREQUENCY CONVERSION SYSTEM

Original Filed Jan. 31, 1936 4 Sheets-Sheet 3

INVENTOR.
LOUIS A. HAZELTINE,
BY Laurence B. Dodds
ATTORNEY.

FREQUENCY CONVERSION SYSTEM

Original Filed Jan. 31, 1936 4 Sheets-Sheet 4

INVENTOR.
LOUIS A. HAZELTINE,
BY Laurence B. Dodds
ATTORNEY.

Reissued July 18, 1939 Re. 21,153

UNITED STATES PATENT OFFICE 21,153

FREQUENCY CONVERSION SYSTEM

Louis A. Hazeltine, Hoboken, N. J., assignor to Hazeltine Corporation, a corporation of Delaware Original No. 2,113,464, dated April 5, 1938, Serial No. 61,819, January 31, 1936. Application for reissue June 4, 1938, Serial No. 211,818

17 Claims. (Cl. 250—27)

Figure 2:
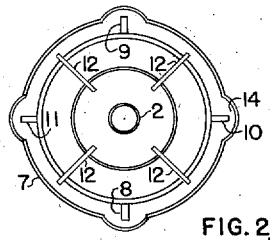

My invention relates to frequency conversion systems, and more particularly to systems of this type which are suitable for use in high-frequency signaling circuits such, for example, as those employed in radio transmitting and receiving systems.

Frequency conversion, or modulation, in high-frequency signaling circuits is, in present practice, accomplished by simultaneously impressing two alternating voltages of given frequencies on a single thermionic vacuum tube, or on a pair of such tubes connected in balanced relation, thereby to obtain variations in the electron emission which, due to the non-linear characteristics of such tubes, contains components having frequencies respectively equal to the sum and difference of the given frequencies. It is well known that the electron emission current in a thermionic tube is substantially proportional to the three-halves power of the effective combined voltage which controls it, when this voltage is in one direction, and is zero when this combined voltage is in the other direction. This type of non-linear characteristic, relating emission current with voltage, inherently introduces distortion into the output of the frequency converter, which distortion is often objectionable.

Two general expedients have been resorted to in practice to eliminate the type of distortion noted above. The first, which is applicable when small impressed voltages are to be used, comprises limiting the voltage variations to such a narrow range on the characteristic curve of the tube that the portion of this curve utilized approximates a parabolic arc, whereby the emission current contains no considerable terms beyond the square-law term. This square-law term has three parts, proportional, respectively, to the square of each voltage and to the product of the two voltages, the last of which contains the desired components having the sum frequency and the difference frequency. It will thus be seen that by employing this expedient distortion is substantially eliminated, provided that the components representing the square of each voltage can be filtered out, which is not always feasible. The second expedient, which is suitable when large impressed voltages are to be used, comprises, employing in the anode circuit of the control tube a resistance which is high as compared to the internal anode resistance of the tube above the anode current cut-off point, and in operating the tube through the cut-off point, so that the combined characteristic curve of the tube and the external resistance consists of a portion corresponding to zero current which is linear alone, and a portion depending primarily on the external resistance, which is also approximately linear when considered alone.

Some of the distortion components in the output of a frequency converter of the general type described above are eliminated when two thermionic tubes are used in balanced relation. In place of two such tubes, it has been proposed to use for frequency conversion a thermionic vacuum tube having a pair of anodes, a pair of control electrodes, and a single cathode. Such a system is shown and described in United States Patent No. 1,343,306, to Carson, granted June 15, 1920. Tubes of this construction have not been used extensively in the above-referred-to application because, among other factors, their arrangement has been such that a relatively large variation in the control voltage applied between the control electrodes is required to produce the desired variation in the division of the current between the anodes, with the result that a single tube of this type is inferior in operation to two separate three-electrode tubes. Further, their arrangement does not entirely eliminate the distortion in the output because the variation in the division of current between the anodes is not directly proportional to the potential difference applied between the control electrodes.

In my copending application Serial No. 61,820, filed January 31, 1936, there is disclosed an improved two-anode electron discharge device of novel construction and arrangement which operates in a new manner, such that the desired variation in the division of the current between the two anodes may be effected by relatively small variations in the controlling influence and is substantially proportional to the control. Briefly described, this improved electron discharge device comprises a cathode, a pair of anodes positioned closely adjacent to each other, and control means, the elements being so arranged that the electrons emitted by the cathode to the anodes are effectively divided into a plurality of parallel streams which are deflected periodically and alternately from each of the two anodes toward the other in accordance with variations in a periodic control, whereby the desired variations in the division of the current between the two anodes are obtained. With such an arrangement of the tube elements, a relatively small change in the control is sufficient largely to deflect the electron streams from one anode to the other, thereby to produce the desired variations in the division of the current between the two anodes. Due to the close spacing between the anodes the change in direction of the electron streams is so small that the division of electrons between the two anodes is substantially proportional to the controlling influence, up to the point at which the electron streams are completely deflected from one anode to the other.

Various arrangements of the tube elements may be employed to obtain the operation described above. One form of tube structure includes a pair of control electrodes in the form of interleaved helices, coaxially disposed about the cathode and displaced therefrom either by equal or by unequal distances, and a pair of similar anodes in the form of a pair of interleaved helices, which surround and have the same helical pitch as the control electrodes. As thus arranged, and with the respective turns of the anodes and the control electrodes registering, or lying in the same right helicoidal path around the cathode, the electrons emitted from the cathode to the anodes may be considered as being divided into a plurality of parallel streams which may be deflected from each anode to the other in response to periodic variations in the electrastatic field produced by a periodic control voltage applied between the control electrodes. With this form of tube structure, the total electron emission to the anodes may be controlled by a second voltage applied between the cathode and the control electrodes jointly.

A number of modified tube structures suitable for use in the systems of the present invention are disclosed in my aforesaid copending application and described in detail hereinafter.

It is an object in my present invention to provide a frequency conversion system which includes an electron discharge device having the operating features described in the preceding paragraphs and which operates in an improved manner to produce the desired modulation of one frequency by another with a minimum of distortion in the converted output.

In accordance with my invention, the above object is attained by providing a frequency conversion system in which two different sources of alternating voltages having the same or different frequencies are connected to the control means of the electron discharge control device of the general type described above, in such mannr that one of the voltages acts to control the total electron emission from the cathode to the anodes and the other voltage acts to control the deflection of the electron streams alternately toward one and then the other of the two anodes. With this arrangement, a voltage of one frequency may be modulated by that of another frequency and the voltage of either the sum or the difference frequency may be selected by means of suitable filter circuits effectively connected or coupled to the anode circuit of the device. With the two sources connected in this manner, to exert the two controlling actions on the electron streams, the relation between the voltage impressed on the deflection control means and the resulting variation in the division of current between the two anodes is substantially linear over a fairly wide range of amplitudes of the deflection control voltage, so long as the variations in this voltage are insufficient to produce complete deflection of the electron streams from each of the two anodes to the other. In this connection, it will be understood that the arrangement is such that the deflection control does not affect the total electron emission, since this would introduce distortion in the manner previously described.

Figure 3:
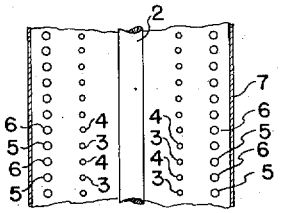
Figure 1:
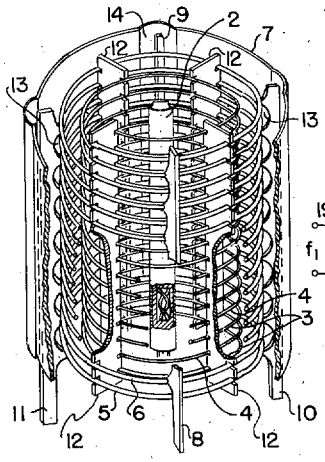
Figure 4:
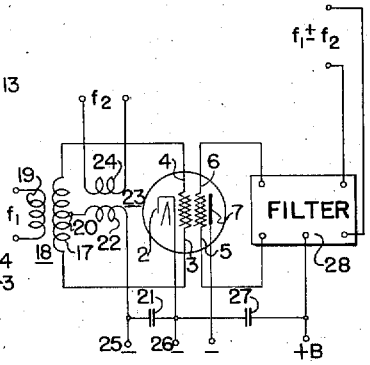
Figure 5:
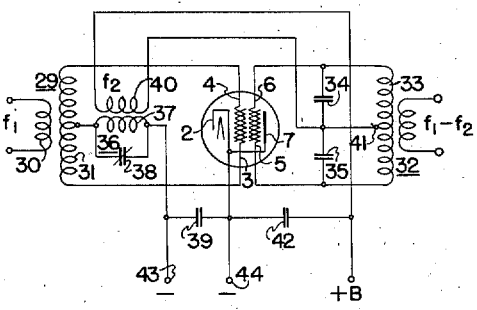
Figure 6:
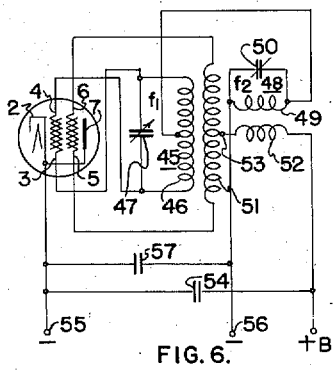

The novel features which I believe to be charatceristic of my invention are set forth with particularity in the appended claims. My invention itself, however, both as to its organization and method of operation, together with further objects and advantages thereof, will best be understood by reference to the following specification, taken in connection with the accompanying drawings in which: Fig. 1 is an enlarged perspective view, partially in section, illustrating an electron discharge device constructed in accordance with the invention disclosed in my aforementioned copending application; Fig. 2 is a top view of the electron discharge device in Fig. 1; Fig. 3 is a fragmentary cross-sectional view of the electron discharge device shown in Fig. 1; Figs. 4–6, inclusive, are circuit diagrams illustrating different forms of my improved frequency-converter system; and Figs. 7–25, inclusive, illustrate further modifications of my improved frequency-converter system resulting, in part, from certain modifications in the form of the electron discharge control device illustrated in Fig. 1.

Referring more particularly to Figs. 1, 2 and 3 of the drawings, there is illustrated one embodiment of my improved electron discharge device as disclosed in my previously mentioned copending application. This device is shown as comprising a plurality of elements which may be supported from a press in any desired manner. For purposes of clarity in describing the invention, the evacuated envelope within which the elements of the electron discharge device are to be mounted has been omitted from the drawings. It will be understood that any form of envelope may be employed which is evacuated to a degree sufficient to insure substantially pure electron emission. The functional elements of the device comprise a cathode 2, which may alternatively be of the indirectly heated type shown or of the directly heated filamentary type, a pair of control electrodes, or grids, 3 and 4 which surround the cathode, a pair of anodes 5 and 6 which surround the control electrodes, and a shield member 7 which encloses the anodes 5 and 6. In the embodiment of my improved electron discharge device illustrated, the control electrodes 3 and 4 are constructed in the form of interleaved helices which are coaxially disposed at equal distances from the cylindrical cathode 2 and are interposed between the cathode 2 and the pair of anodes 5 and 6. The anodes 5 and 6 are constructed in a similar manner to form interleaved helices having the same pitch and the same direction of twist as the control electrodes, are coaxially disposed with respect to the cathode 2, and surround the control electrodes 3 and 4.

Although any desired form of supporting means may be employed, the type of means illustrated will provide the necessary rigidity of the structure to maintain the respective electrodes in their proper relative positions. This means includes four metallic posts, 8, 9, 10 and 11, for supporting the anodes 5 and 6, and mica spacers 12, each provided with recesses along each edge thereof which engage the turns of the anodes and the turns of the control electrodes to support the latter from the former. The metallic posts 8 and 9 may be spot-welded to the turns of the anode 5 at points displaced 180° and are provided with cut-out portions 13 adjacent to the turns of the anode 6 which prevent any electrical connection between the two anodes within the tube.

Similarly, the metallic posts 10 and 11 may be spot-welded to the anode 6 and are provided with cut-out portions 13 for preventing an electrical connection between the two anodes. As shown in Fig. 2, the shield 7 may be provided with longitudinally extending depressions 14 to accommodate the four supporting posts 8–11, inclusive, and to permit the correct spacing of the shield with respect to the anodes without a conductive connection therebetween.

The relative positions occupied by the respective electrodes are best illustrated in the fragmentary cross-sectional view shown in Fig. 3. It will be seen that the turns of one of the control electrodes and the turns of one of the anodes lie in the same right helicoid and register with each other. Thus, at the plane of cross-sectioning the cross-sectioned surface of the electrode 3 is on a line perpendicular to the cathode 2 and passing through the anode 5. Similarly, and in the same plane the cross sectioned surface of the electrode 4 is on a line perpendicular to the cathode 2 and passing through the anode 6.

With the above-described arrangement of the elements, the two control electrodes function to separate the electrons flowing toward the anodes into a plurality of streams. For example, each turn of each of the helical anodes and control electrodes may be considered to be a section of the electrodes of which it forms a part; the several sections, or turns, being connected together at their ends to form a continuous element. As thus considered, the helicoidal path extending substantially perpendicularly from the cathode and between each adjacent pair of single turns of the two control electrodes may be described as constituting a path for one electron stream, and this path will be seen to be parallel to the path of the stream flowing in the helicoidal path perpendicular to the cathode and extending between the next adjacent pairs of single turns of the control electrodes. The rate of electron emission may be controlled by the combined effect of the two control electrodes. Thus, if the instantaneous potentials of the electrodes 3 and 4 with respect to the cathode 2 are equal and are varied equally and simultaneously, as by the application of the same instantaneous component of a periodic voltage to both electrodes, the rate of emission of electrons will be varied accordingly, thereby to vary the magnitude of the current which can flow from either of the anodes 5 and 6 to the cathode 2. Also, the direction of the electron streams may be changed by varying the electrostatic field between the two electrodes 3 and 4, whereby a greater proportion of the emitted electrons will reach one anode than the other anode. Thus, considering the two lowermost turns of the control electrodes and anodes shown in Fig. 3, if the electrode 3 alternately be made more negative with respect to the cathode 2 than the electrode 4, so that the electrostatic field between the two electrodes is varied the electrons will alternately be deflected toward one and then the other of the anodes 5 and 6. It will, therefore, be seen that, if an alternating voltage be impressed between the control electrodes 3 and 4, the electron streams will alternately be deflected from each anode toward the other anode.

It will, of course, be understood that the division of the streams of electrons between the two anodes will be influenced to a lesser degree by the relative potentials of the two anodes. For example, if the anode 5 be made more positive with respect to the cathode 2 than the anode 6, the electrons will be attracted with greater intensity toward the anode 5, and vice versa.

It will be seen that the electrons which pass between the anodes 5 and 6 will, at least in part, be attracted back to these anodes, but some may reach the shield 7, particularly if the potential of the shield is not sufficiently negative to overcome the initial velocity of the electrons. In order to minimize this tendency, the shield 7 may be biased to a potential slightly negative with respect to the cathode 2, thereby to repel the electrons toward the two anodes. However, if the initial velocity of the electrons be sufficiently low, the negative bias may be omitted and the shield 7 connected directly to the cathode 2.

The shield 7, which encloses the anodes 5 and 6, is provided for a threefold purpose. In the first place, the shield prevents the electrons which pass between the anodes from accumulating on the inner surface of the tube envelope and thereby prevents an undesired electrostatic charge from being built up on this surface. Secondly, the shield reduces the secondary emission of electrons from the momentarily less positive anode to the more positive anode; and, thirdly, the shield acts as an electrostatic shield to reduce the capactive couplings between the input circuits and the output circuits connected to the device. The shield is particularly effective in reducing the capacitive coupling between the two control electrodes jointly and the two anodes jointly. In order further to reduce secondary electron emission from one anode to the other anode and further to decrease the capacitance between the electrodes, the shield 7 may be provided with inwardly projecting helicoidal members, or fins (not shown), which extend between the two anodes. The function of these fins, when the shield is connected to the cathode, is essentially that of a suppressor electrode as employed in the conventional pentode tube.

Referring to Fig. 4 of the drawings, there is illustrated one embodiment of my improved frequency conversion system which includes an electron discharge device having the structural and operating features described above. In this system the input electrodes 3 and 4 of the electron discharge device are connected to the terminals of the secondary winding 17 of a transformer 18 having its primary winding 19 connected to a source (not shown) of alternating voltage having a frequency $f_1$. The mid-point 20 of the secondary winding 17 is connected to the cathode 2 through a by-pass condenser 21 and the secondary winding 22 of a transformer 23. The primary winding 24 of the transformer 23 is connected to a second source (not shown) of alternating voltage having a different frequency $f_2$. In order to bias the control electrodes 3 and 4 to the proper negative potential with respect to the cathode 2, a source (not shown) of biasing potential may be connected between the terminals 25 and 26, the negative side of this source being connected to the terminal 25. The anodes 5 and 6 of the electron discharge device are connected to the input terminals of a filter system, indicated schematically at 28, which may have its output terminals connected to any desired utilizing circuit (not shown). The circuits between the anodes 5 and 6 and the cathode 2 are completed through a source of anode potential, indicated at +B, shunted by a by-pass condenser 27.

It will be observed that the voltage having the frequency $f_2$ is simultaneously impressed on each of the control electrodes 3 and 4, thereby to vary the average potential thereof with respect to the cathode 2. In this manner, the rate of electron emission from the cathode 2 to the anodes 5 and 6 is controlled in accordance with the variations in the alternating voltage applied to the terminals of the primary winding 20. Also, the control electrodes cause the emitted electrons to separate into a plurality of streams, as explained above, which, due to the positive potential of the anodes, travel toward the anodes. Simultaneously with the control of the electron emission, the electron streams thus formed are alternately deflected from each anode toward the other by the electrostatic field between the two control electrodes 3 and 4 produced by the alternating voltage impressed on the terminals of the primary winding 19. The anode currents, in flowing through the impedances of filter 28, build up a potential difference between the anodes 5 and 6 which has a frequency $f_1$ but which is modulated at a frequency $f_2$. The result is, in effect, the production of two potential differences whose frequencies are $f_1+f_2$ and $f_1-f_2$, which exist across the input terminals of the filter. The filter 28 may be designed selectively to transmit to its output terminals a voltage having either of the two frequency components noted. It will be seen that, because of the symmetry of the arrangement, no voltage having a frequency $f_2$ is produced between the anodes 5 and 6.

It is known that the inherent capacitance between the anode and the control electrode of a vacuum tube causes coupling between the input and the output circuits connected thereto, which is often very undesirable and which is commonly made negligible by the interposition of a screen grid between the control electrode and the anode. In the embodiment of my invention described above, this expedient is unnecessary, insofar as coupling between the input and output circuits is concerned, for the reason that the system is almost completely self-neutralized. This is partly because each control electrode partly shields the other control electrode, and each anode partly shields the other anode; but is mainly because each anode has nearly equal capacitances (which have opposite effects) to the two control electrodes, and each control electrode, similarly, has nearly equal capacitances to the two anodes.

In the embodiment of my invention illustrated in Fig. 5, there is shown a system which may, by suitable adjustment of the circuit elements, alternatively be employed as a beat frequency oscillator-modulator unit for a superheterodyne receiver, or as a zero beat frequency oscillator-detector for use in a homodyne receiver. The circuit shown differs from that of Fig. 4 in that the second source of alternating voltage comprises a tunable resonant circuit which is maintained in continuous oscillation by impressing thereon an alternating voltage having the frequency of the resonant circuit and derived from the output circuit of the oscillator-modulator unit. Briefly described, the system comprises a transformer 29 having a primary winding 30, which is traversed by the modulated carrier current derived from a preceding portion of the receiver, and a secondary winding 31 for impressing the modulated carrier voltage between the control electrodes 3 and 4. The anode circuit includes the primary winding 33 of a transformer 32 connected between the two anodes 5 and 6, the primary winding 33 being shunted by a pair of series-connected by-pass condensers 34 and 35.

The total electron emission from the cathode 2 to the anodes 5 and 6 is controlled by the voltage developed between the terminals of a resonant circuit 36 comprising a parallel-connected inductance 37 and variable condenser 38. This circuit is connected between each of the two control electrodes 3 and 4 and the cathode 2 through the condenser 39 and the two sections of the secondary winding 31. In order to maintain the resonant circuit 36 in continuous oscillation at its natural resonant frequency, a feed-back path is provided which includes a winding 40 connected to the mid-point 41 of the winding 33 and is inductively coupled to the inductance 37. It will be noted that the two branches of the output circuit are connected to the cathode 2 through the common connection which includes the winding 40 and a source of anode potential +B shunted by a high-frequency by-pass condenser 42. It will further be noted that the control electrodes 3 and 4 may be biased to the proper negative potential with respect to the cathode 2 by impressing between terminals 43 and 44 a source of unidirectional voltage of the proper value.

If it be desired to operate the oscillator-modulator system of Fig. 5 as the converter stage in a superheterodyne type of radio receiver, the primary winding 30 may be connected to the output circuit of the preceding radio-frequency amplifier stage, thereby to impress between the control electrodes 3 and 4 a received modulated radio-frequency carrier voltage. This voltage produces deflection of the electron streams developed in the electron discharge device alternately toward each of the two anodes 5 and 6, thereby to produce variations in the division of the anode current flowing therefrom toward the cathode 2 in accordance with the frequency of the incoming carrier. The anode circuit of the system being symmetrical with respect to the cathode 2, the carrier frequency component of this current balances out in the winding 33 so that no carrier-frequency component of voltage appears between the mid-point 41 and the cathode 2. With the system in operation, the sum of the two anode currents flows through winding 40 and impresses a voltage on the resonant circuit 36. This circuit may be adjusted, by means of the variable condenser 38, to a resonant frequency above or below the carrier frequency and differing therefrom by any desired predetermined amount. By making the circuits which are energized from the winding 33 responsive to only the desired beat frequency, as modulated with the audio-frequency component of the received carrier and corresponding to the modulated intermediate frequency of an ordinary superheterodyne receiver, such beat frequency will be passed to the succeeding portions of the receiver. It will be understood, of course, that, if this system be employed in the application noted, the adjustable element of the condenser 38 will be connected for unicontrol with the adjustable elements of the frequency-selecting circuits included in the preceding radio-frequency portion of the receiver.

By adjustment of condenser 38, in Fig. 5, to make the circuit 36 resonant to the frequency of the signal carrier, the system may be caused to operate as a zero beat frequency oscillator of the general type employed in a homodyne detector.

Referring now to Fig. 6 of the drawings, there is illustrated an oscillator-modulator unit which may be employed to modulate a radio-frequency voltage at an audio frequency and which is particularly useful for laboratory testing purposes. The arrangement comprises a tunable radio-frequency resonant circuit 45, including a parallel-connected inductance 46 and a variable condenser 47, and a tunable audio-frequency resonant circuit 48 comprising an inductance 49 and a variable condenser 50. The resonant circuit 45 is connected between the control electrodes 3 and 4 and is inductively coupled to an inductance 51 connected between the anodes 5 and 6. The circuit 48 is connected between each of these two control electrodes and the cathode 2, is inductively coupled to an inductance 52 which is connected to the mid-point 53 of the inductance 51, and forms a part of the common portion of the two branches of the anode circuit which extend between the anodes 5 and 6, respectively, and the cathode 2. The anode circuit also includes a source of anode potential +B, connected to one terminal of the inductance 52 and shunted by a condenser 54. The two control electrodes may be biased to suitable operating potential with respect to the cathode 2 by the application of voltage between the terminals 55 and 56, which terminals are shunted by a bypass condenser 57.

In the operation of the circuit shown in Fig. 6, energy is supplied to the two tunable frequency-determining circuits 45 and 48 through the respective inductive couplings between the windings 46 and 51 and the windings 49 and 52, thereby to maintain each of the two resonant circuits in continuous oscillation. With the two resonant circuits oscillating, an alternating voltage having a radio frequency determined by the resonant frequency of the circuit 46 is impressed between the two control electrodes 3 and 4, thereby to cause the above-described deflection of the electron streams alternately toward one and then the other of the two anodes 5 and 6. Simultaneously, an audio-frequency voltage is impressed between each of the two control electrodes 3 and 4 and the cathode 2 by the resonant circuit 48, thereby to control the total electron emission to the anodes. Thus, the current flowing toward the cathode and through the winding 51 contains a radio-frequency component which is modulated at an audio frequency. Adjustment of the frequency of either the audio- or radio-frequency components may be obtained by proper adjustment of the respective tuning elements 50 and 47.

Figure 7:
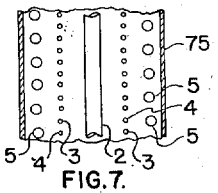

While I have described my improved frequency-converter system as including an electron discharge control element having a pair of anodes symmetrically disposed with respect to the cathode 2, it may be found to be desirable to employ a control device in which the shield which encloses the other elements of the tube is used as one of the anodes. Such a tube structure is illustrated in Fig. 7, wherein the surrounding metal cylinder 75 may be connected as an anode. The structure of the tube shown in this figure is otherwise identical with that illustrated in Fig. 1.

Figure 8:
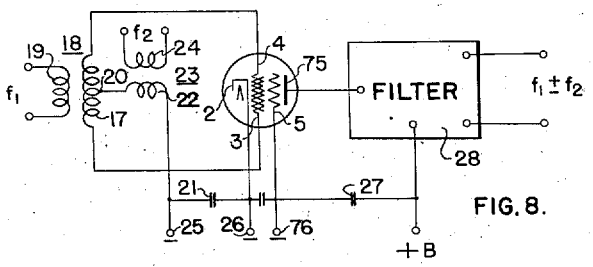

The use of the shield in place of one of the helical anodes does not essentially modify the operation of the control tube, the deflecting action of the control electrodes 3 and 4 being such that the electron streams are deflected alternately toward the active surfaces of one and then the other of the two anodes 5 and 75 in the same manner as has been previously described. It will, therefore, be apparent that this tube may be used in any of the previously described frequency conversion systems without substantial modification thereof. However, it may be desirable to employ a frequency-converter circuit arrangement as illustrated in Fig. 8, which is similar to that shown in Fig. 4, with the exception that only the anode 75 is directly connected in the output circuit, the anode 5 being maintained at a fixed positive potential by the application of voltage thereto through the terminal 76. In this circuit the anode 5 functions as a screen grid between the control electrodes 3 and 4 and the single anode 75. As is usual in such circuits, the positive potential applied to the electrode 5 is maintained at a value less than that applied to the anode 75. In this system, not only does the anode 5 serve as a screen grid greatly to decrease the inherent capacitance between the anode 75 and the control electrodes, but also the symmetrical arrangement of the control electrodes results in a large degree of self-neutralization, in the manner previously described.

Figure 9:
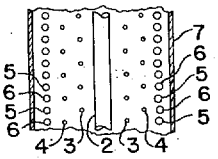

In Fig. 9 there is illustrated a further modification of the electron discharge control device, wherein the helices are disposed in such a manner that the turns of the helical control electrodes are arranged in staggered relation with respect to each other, the turns of one of the electrodes being displaced from the cathode by a distance greater than the distance between the other electrode and the cathode. Thus, the control electrode 4 is shown as being a helix of larger diameter than the helix formed by the electrode 3 and concentrically positioned with respect to the cathode 2 about the control electrode 3. As thus arranged, the turns of electrode 4 are displaced a greater radial distance from the cathode 2 than the turns of the control electrode 3, and an unsymmetrical structure is produced in which the turns of the electrode 4 surround the turns of the electrode 3.

Figure 10:
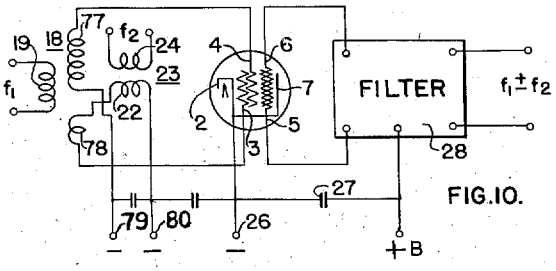

The dissymmetry of the tube structure does not alter the fundamental electron deflecting action of the control electrodes, but it does make it desirable to employ an unsymmetrical input circuit connected between these two electrodes. Such an unsymmetrical circuit arrangement is shown in Fig. 10, which is similar to the frequency converter circuit of Fig. 4 but differs therefrom in that the secondary winding of the transformer 18 is divided into two sections 77 and 78 having unequal numbers of turns. The coil 77, having the greater number of turns, is connected to the control electrode 4 farthest removed from the cathode 2 and the section 78, having the smaller number of turns, is connected to the control electrode 3 nearest the cathode 2. The operation of this circuit is essentially the same as that described in connection with the circuit of Fig. 4, the turn ratio of the windings 77 and 78 being adjusted so that fluctuations of the potentials applied to the control electrodes 3 and 4 by the transformer 18 do not produce any change in the total electron emission. Further, the turn ratios of the windings of the coupling means comprising the transformers 18 and 23 are so proportioned that the voltage impressed on the control electrodes to vary the total electron emission to the anodes does not affect the deflection of the electron streams between the two anodes. In this connection, it will be understood that biasing potentials are applied to the control electrodes 3 and 4 through separate terminals, as by the terminals 79 and 80. For simplicity, only the control electrode 3 nearest the cathode is used for emission control, including in its circuit the secondary 22 of the transformer 23.

In the electron discharge device illustrated in Fig. 11, the anode 6 is omitted, the cylindrical electrode 75 operating as a second anode in the manner described in connection with Fig. 7; and the unsymmetrical arrangement of control electrodes is used as in Fig. 9. A tube having this structure may be employed in an unsymmetrical frequency-converter circuit of the type illustrated in Fig. 12. In this circuit a source of voltage having a frequency $f_1$ is coupled by means of a transformer 81 to control the deflection of the electron streams between the two anodes 5 and 75. The transformer 81 includes a pair of secondary winding sections 82 and 83 connected in series between the control electrodes 3 and 4 by the coupling condenser 84. A source of voltage having a frequency $f_2$ is simultaneously impressed on the electrodes 3 and 4, thereby to control the total electron emission to the anodes. The connections between the source $f_2$ and the control electrodes include the transformer 85, comprising a primary winding 86 and two secondary windings 87 and 88. The output circuit connected between the anodes 5 and 75 and the cathode 2 includes the primary winding of a transformer 89 to which is connected at a tap 90 the positive terminal of a source of anode voltage +B.

Figure 12:
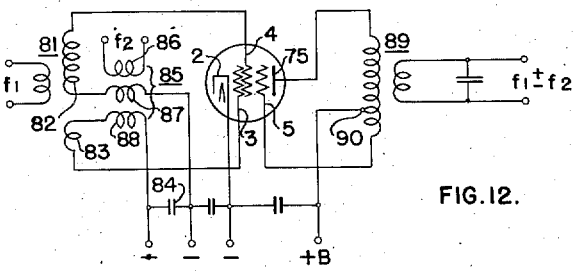

The operation of the circuit shown in Fig. 12 is similar to that described in connection with the circuit of Fig. 4, the turn ratios of the coupling transformers being adjusted to compensate for the dissymmetry produced by the unsymmetrical positioning of the control electrodes 3 and 4 and the unsymmetrical arangement of the anodes 5 and 75. In both cases the relative numbers of turns of the transformers are such that the voltage of frequency $f_1$ does not affect the electron emission and the voltage of frequency $f_2$ does not appear between the anodes 5 and 75.

Figure 11:
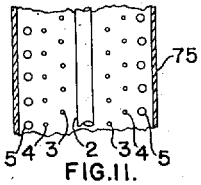
Figure 13:
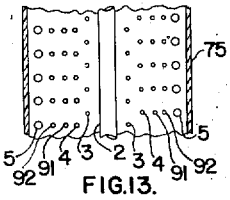
Figure 14:
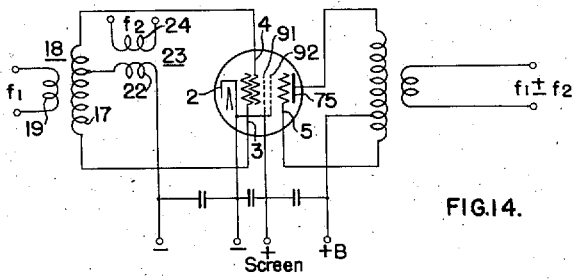

In Fig. 13 there is illustrated a still further modification of the electron discharge control device, in which an additional pair of electrodes, comprising a helical screen grid 91 and a helical suppressor grid 92, are included in the device in addition to the elements described in discussing Fig. 11. A frequency-converter circuit including an electron discharge device having these two additional electrodes is illustrated in Fig. 14. In this circuit the suppressor grid 92 is shown as being connected within the tube to the cathode 2 and the screen grid as being connected to the positive terminal of a direct-current source +screen, so that the latter grid is maintained at a positive potential below that of the anodes 5 and 75. The fundamental operation of this circuit is essentially the same as that of each of the previously described frequency-converter circuits. Accordingly, a description thereof is deemed to be unnecessary.

Figure 15:
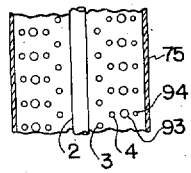
Figure 16:
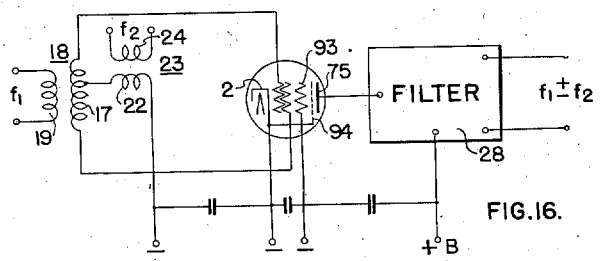

In the electron discharge device illustrated in Fig. 15, the metal cylinder 75 functions as a single anode and the helical electrode 93 functions as a screen grid. A helical suppressor grid 94 is provided which is interposed between the electrode 93 and the anode 75. The circuit connections for the application of this electron discharge device to a frequency-converter circuit are illustrated in Fig. 16, which differs from the circuit shown in Fig. 14 only in that a single anode is employed, the screen grid is formed by the electrode 93, and the electrode 94 is connected to the cathode 2 to form a suppresor grid.

Figure 17:
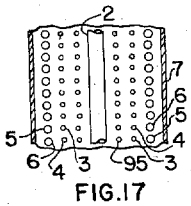
Figure 18:
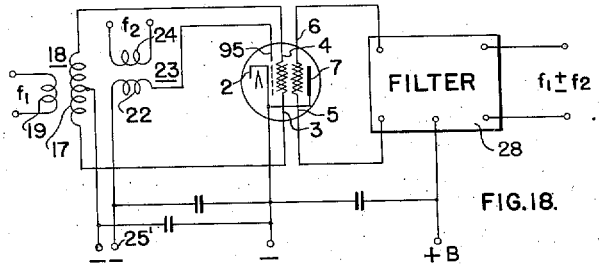

In the structure of the electron discharge device shown in Fig. 17, an additional control electrode 95 is provided between the cathode 2 and the interleaved helical control electrodes 3 and 4. This electrode, when connected in a frequency-converter circuit, operates independently of the control electrodes 3 and 4 to control the electron emission from the cathode 2 to the anodes 5 and 6, the control electrodes 3 and 4 operating solely to deflect the electron streams alternately from one anode toward the other. Such a circuit, having embodied therein the tube of Fig. 17, is illustrated in Fig. 18, from which it will be seen that the only differences between the circuit of this figure and that of Fig. 4 reside in the connection of one terminal of the winding 22 to the aditional electrode 95 rather than to the electrodes 3 and 4 through the winding 17, and the connection of the other terminal of the winding 22 to a separate source of bias at terminal 25'.

In each of the forms of the electron discharge device thus far described, the deflection control voltage and the emission control voltage have been impressed on control electrodes distinct from the anodes. It will be understood, however, that one or both of these voltages may be impressed on the anodes by suitable circuit connections. For example, in Fig. 19 there is illustrated an electron discharge device which includes the two anodes 5 and 6, the cathode 2, and a single electrode 96, for controlling the electron emission from the cathode 2 to the two anodes. This electron discharge device functions as a relay with respect to the electron emission control, in a manner analogous to the usual three-electrode vacuum tube. However, with respect to the electron deflection control, it has no relay action, behaving in this respect in a manner analogous to a rectifier, the deflection control voltage being impressed between the two anodes.

Figure 19:
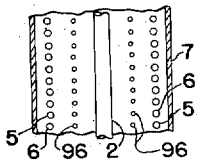
Figure 20:
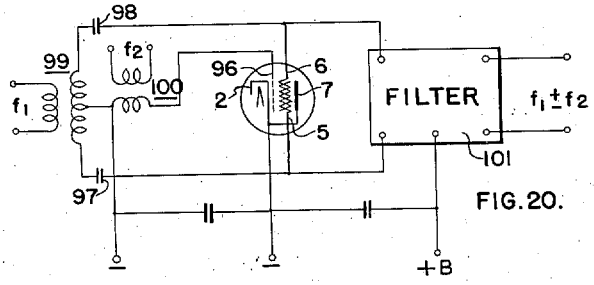

A frequency conversion system, which includes a device having the construction shown in Fig. 19, is illustrated in Fig. 20, wherein the anodes 5 and 6 are connected through blocking condensers 97 and 98 to the secondary of a transformer 99, receiving through its primary winding terminals a current having a frequency $f_1$. The consequent alternate deflection of the electron streams from one anode to the other, produced by the voltage of frequency $f_1$ impressed between the two anodes, is equivalent to the production of a current of frequency $f_1$ flowing between the anodes and through the secondary of transformer 99. A voltage having a frequency $f_2$ may be impressed by a transformer 100 on the electrode 96, to vary the electron emission at a frequency $f_2$ which, in effect, varies the resistance between the anodes 5 and 6 at this same frequency $f_2$. It follows that component potential differences are built up between the anodes 5 and 6 having frequencies which are the sum and the difference of the frequency $f_1$ and the frequency $f_2$. By proper design of the filter 101 connected to the anodes 5 and 6, a voltage having either the sum frequency or the difference frequency of the frequencies $f_1$ and $f_2$ may be developed across the output terminals of the filter.

In the arrangement illustrated in Fig. 20, it is assumed that the difference frequency alone is desired and that this frequency is considerably lower than $f_1$, so that it is effectively blocked from the input circuit by the condensers 97 and 98. Other well-known expedients may be used to separate the anode current from the input current, particularly if the output frequency is not considerably lower than $f_1$, as, for example, if the sum frequency is desired. Thus, the input and output circuits may effectively be connected in series instead of in parallel.

Figure 21:
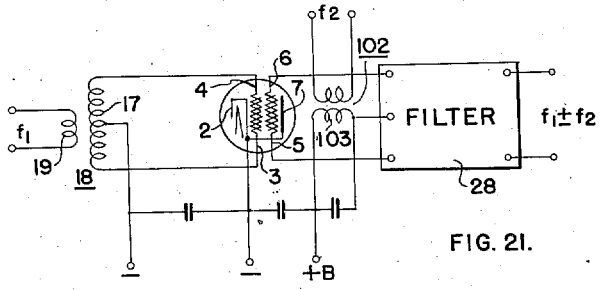

Referring to Fig. 21 of the drawings, there is illustrated a system wherein the emission control voltage is impressed on the two anodes 5 and 6 and the deflection control voltage is impressed between the two control electrodes 3 and 4. The circuit arrangement differs from that of Fig. 4 only in that the emission control voltage of frequency $f_2$ is impressed on the anodes instead of the control electrodes. To apply the voltage of frequency $f_2$ on the two anodes, a transformer 102 is provided having a secondary winding 103 included in the common connection between the two anodes 5 and 6 and the cathode 2. In this system, the modulation is effected in the anode circuit in a manner analogous to the Heising system of modulation commonly used in radio transmitters.

Figure 22:
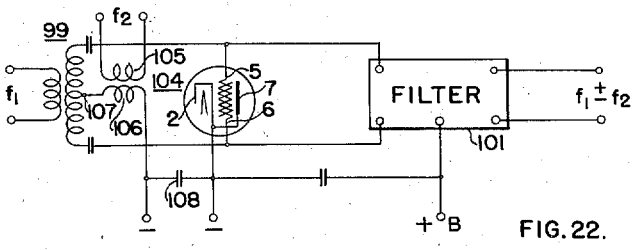

In the circuit arrangement illustrated in Fig. 22, the two control electrodes 3 and 4 are omitted, both of the control voltages being applied to the anodes 5 and 6. This circuit is similar to that shown in Fig. 20 but transformer 100 is omitted from the circuit, being replaced by a transformer 104 for impressing the voltage of frequency $f_2$ between the anodes 5 and 6 jointly and the cathode 2. The transformer 104 comprises a primary winding 105 traversed by the current of frequency $f_2$ and a secondary winding 106 which is connected between the mid-point 107 of the secondary winding of transformer 99 and the cathode 2 through the by-pass condenser 108. It will be understood that in this arrangement the two anodes may be symmetrically arranged, as indicated, or the outer shield may be used as an anode, one of the interleaved anodes 5 or 6 being omitted. As in Fig. 20, the deflection of the electron streams from one anode to the other is controlled by the voltage of frequency $f_1$, impressed between the anodes by transformer 99. The emission, on the other hand, is controlled by the voltage of frequency $f_2$, impressed between the anodes jointly and the cathode by transformer 104. Like the system shown in Fig. 20, the input and output circuits are effectively connected in parallel.

Figure 23:
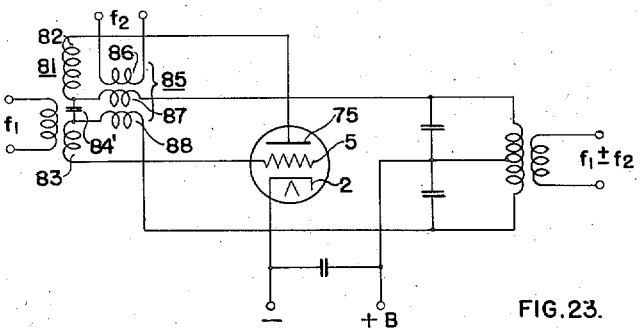

The arrangement shown in Fig. 23 operates in a manner similar to that of Fig. 22, but the input circuit and the output circuit are connected in series instead of in parallel. This arrangement may sometimes be more convenient. A further difference between the two systems lies in the fact that the vacuum tube shown is unsymmetrical, one anode 5 having the form of a grid and the other anode 75 having the form of a shield or plate external to the grid, being in this respect similar to the anodes of Figs. 7 and 11, for example. The tube structure is, in fact, essentially that of an ordinary triode, but the circuit arrangement is quite different from that of conventional frequency conversion circuits wherein ordinary triodes are used. The input circuit corresponds closely to that of Fig. 12 and like reference characters are used to identify similar elements. The deflection control voltage of frequency $f_1$ is impressed between the anodes 5 and 75 by secondary windings 82 and 83 of transformer 81; these windings having such a turn ratio that the deflection control voltage does not affect the electron emission, as previously described. The emission control voltage of frequency $f_2$ is impressed between the anodes 5 and 75 jointly and the cathode 2 by secondary windings 87 and 88 of transformer 85. While not always necessary, condenser 84' is provided to localize the current of frequency $f_1$, which flows through the electrostatic capacity between electrodes 5 and 75, and to prevent this current from entering the emission control circuit through the windings 87 and 88. When this condenser 84' is used, the windings 87 and 88 will preferably have equal numbers of turns, so that transformer 85 will not tend to send a current of frequency $f_2$ through the circuit including in series the three condensers shown. These refinements in the circuit arrangement are important only when the frequencies $f_1$ and $f_2$ are relatively high.

While the electron deflection control has been described as comprising a pair of control electrodes which, through their electrostatic action on the electron stream, produce the desired alternate deflection of the electron streams toward one and then the other of two anodes, it is pointed out in my previously referred to copending application that a similar operation may be obtained by utilizing a varying magnetic field to produce the desired deflection of the electron streams. Thus, in Fig. 24 there is illustrated an electron discharge device which comprises a cathode 109, about which are concentrically disposed a plurality of axially extending filamentary grid sections 110 which are connected together within the tube to form a control electrode. Concentrically disposed with respect to the cathode 109 are a plurality of axially extending filamentary anode sections 111, alternate ones of which are connected together within the tube to form a pair of interleaved anodes. The number of grid sections is half the number of anode sections, each grid section registering with the passage between two adjacent anode sections. A shield 112 surrounds the assembly of the sections and is, in turn, enclosed within an evacuated envelope 113 having a degree of vacuum sufficient to insure efficient substantially pure electron emission. In order to reduce eddy currents in the shield, a slit 112' is provided therein which extends longitudinally along the shield. For the purpose of deflecting the electron streams between the two anodes, a winding 114 is placed around the envelope and includes connections for excitation by a suitable control current.

Figure 24:
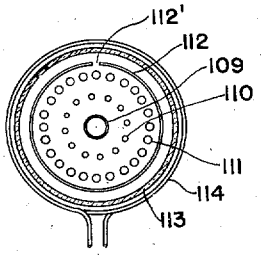
Figure 25:
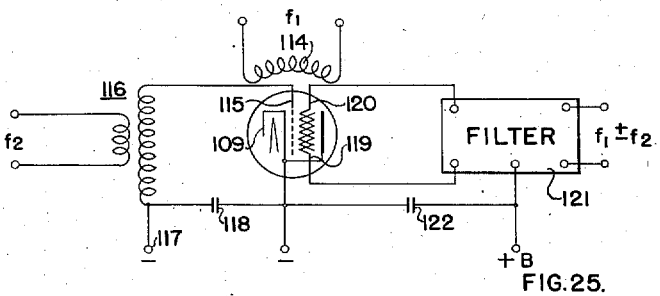

A frequency-converter circuit having included therein an electron discharge device of the construction illustrated in Fig. 24 is shown in Fig. 25. In this circuit, a source of alternating voltage having a frequency $f_1$ is impressed on the terminals of the winding 114 and a second source of alternating voltage, having a frequency $f_2$, is impressed, through the transformer 116, on the emission control electrode 115, formed by the connected filamentary sections 110. The control electrode 115 is biased to the proper negative potential by means of a source of voltage (not shown) connected between the cathode and the terminal 117 and shunted by a by-pass condenser 118. The two anodes 119 and 120, formed by the alternately connected filamentary sections 111, are connected in an output circuit which includes the input terminals of a filter 121 and a source of anode voltage (not shown) shunted by a by-pass condenser 122.

In the operation of the circuit shown in Fig. 25, emission of electrons from the cathode 109 to the two anodes is varied at a frequency $f_2$ by virtue of the voltage applied to the control electrode 115. Each electron stream emitted to the two anodes is deflected alternately toward one and then the other of adjacent anode sections by the alternating magnetic field produced within the discharge device by the winding 114.

The frequency conversion systems herein described are particularly applicable to three common uses occurring in carrier current communication; namely, for modulation in a transmitter, for modulation to provide the intermediate frequency in a superhetrodyne receiver, and for detection in a receiver. In all such uses, it is desired to combine a voltage of a single fixed frequency with a signal voltage containing a band of frequencies. The advantage in minimizing distortion will, in general, be most fully realized if the signal voltage is used for the deflection control and the single fixed frequency for the emission control. However, this order of applying the voltages to the control means may be reversed.

In a transmitter, if a tube having a symmetrical arrangement of the anodes, such as that shown in Fig. 4, is used in a modulator system as illustrated, and the signal voltage is used for the electron deflection control ($f_1$ being a component of the audio frequency), the carrier (of frequency $f_2$) will not appear in the output circuit. Such a carrier suppression system may be used alone, or to supply the quadrature modulated component in a frequency modulation system of the type described in United States Patent No. 1,941,068, to Armstrong, granted December 26, 1933. If, on the other hand, a tube having an unsymmetrical anode arrangement is used in a system such as that of Fig. 8, the signal voltage again being used for the electron deflection control, the system will operate to produce the usual amplitude modulation and the output will contain the carrier modulated by both sidebands of frequency.

In a superhetrodyne receiver for amplitude modulated signals, if the signal voltage is used for the electron deflection control ($f_1$ being a radio-frequency component of the signal) and the local oscillation is used for emission control (at the frequency $f_2$), the signal voltage should be impressed between electrodes at a sufficiently low level to give linear operation at all amplitudes of the modulated carrier. On the other hand, in a superhetrodyne receiver for frequency modulated signals, if the signal voltage again is used for the electron deflection control, the signal voltage may be impressed between electrodes at a high level so as to completely deflect the electron streams from one anode to the other, thus providing a limiting action useful in receiving such signals. Since this limiting action may not be fully effective over a wide range of signal intensities, it may be desirable to supplement this action by automatic amplification control applied to a preceding radio-frequency amplifier stage, thereby to keep the signal voltage within a fairly narrow range.

In a detection system not employing a local homodyne oscillation, the complete signal voltage (of which $f_1$ is a component frequency) may be used for the electron deflection control, and a sharply tuned circuit arrangement may be used to select from the signal the carrier voltage alone (of frequency $f_2$), which may then be used for the electron emission control. In this application the electron emission control voltage should be adjusted to be in phase with the carrier component of the electron deflection control voltage, in order to reproduce the original wave form of the audio-frequency signal. When this phase relation exists, the two sidebands of an ordinary double sideband received signal will be fully additive in their effect, giving maximium response. Also, the combination of the electron emission control voltage and the carrier component of the electron deflection control voltage will give a maximum direct voltage (which corresponds to zero frequency). This direct voltage may be used for control purposes in an automatic amplification control system.

In a homodyne detection system, which employs a local oscillation whose frequency is equal to the carrier frequency of the signal, the complete signal voltage may be used for the electron deflection control and a voltage from the local oscillation may then be used for the electron emission control. The phase relation between these two control voltages should, as stated in the preceding paragraph, thereby give the resulting operation therein set forth.

The arrangements described in the two preceding paragraphs give linear detection and so avoid the distortion present in non-linear detectors, even of the square-law type. They are particularly useful in the detection of signals in which only a single sideband is transmitted, since even the conventional self-rectifying linear detector inherently distorts such signals, unless the carrier component is exceedingly large relative to the sideband components, because the rectification occurs for the intervals during which the signal voltage has a certain direction and these intervals are not equal in a single sideband signal. This effect is absent in the systems herein described, where the effective rectification is due to the electron emission control voltage having successive cycles which are all alike.

The frequency conversion systems herein described have a further and special application in the automatic tuning control of superhetrodyne receivers. The arrangement is similar to that employed for signal detection, as described above, except that the electron emission control voltage is arranged to be normally in quadrature with the carrier component of the intermediate-frequency signal voltage, instead of in phase therewith. The combination of these voltages gives a direct voltage which is normally zero but which departs from zero in one direction or the other if the phase difference between the two voltages departs from quadrature. The two cases must be considered separately, according to whether the electron emission control voltage is derived from the sharply selected carrier or from a local homodyne oscillator. In the former case, the phase difference just mentioned changes rapidly as the intermediate frequency departs from the resonant frequency of the sharply tuned circuit; and the direct voltage obtained is available for controlling the frequency of the superhetrodyne oscillator in such a manner as to bring the intermediate frequency substantially into coincidence with the resonant frequency. In the latter case, the direct voltage obtained is available for controlling the phase of the heterodyne oscillator in such a manner as to bring the phase difference mentioned substantially into quadrature. If desired, this phase correction may be used to supplement the frequency correction just described.

Although in certain of the various embodiments of the improved electron discharge device described herein, the control electrodes and the anodes are described as being helical in form, it will be understood that they may be made in any of various suitable forms, several of which are described in my above-mentioned copending application. In this connection, it will be understood that the term "section" appearing in this specification and in the appended claims is used in its broad sense to denote one of the elemental components of any form of electrode. For example, in the helical form described, even though the electrodes are actually continuous helices and the electron stream is actually continuous, to aid in the analysis of the operation of the tube, the electrodes may be considered to comprise a plurality of elemental turns or sections and the electron stream may be considered to be made up of a plurality of substantially annular streams bonded by the adjacent sections of the two electrodes. In such a structure the term "section", thus, refers to any single elemental component or turn. In the planar form of electrode, the term refers to any single conductor electrically connected to the common connection between the several conductors.

It will further be understood that the term "interleaved", appearing herein, is used broadly to denote the relation of the two electrodes by which corresponding elemental sections, or surfaces, of each electrode directly exposed to the cathode alternate with corresponding sections, or surfaces, of the other, whether or not such sections or surfaces are actually at equal distances from the cathode. For example, in the form of the device wherein the corresponding turns or sections of the two control electrodes have different diameters and do not register with each other, the electrodes may be regarded as interleaved. Again, in the embodiment wherein only one helical anode is provided and the cylindrical electrode is connected to function as the second anode, the helical inner surface of the cylindrical electrode lying between the turns of the helical electrode and directly exposed to the cathode may be regarded as an anode interleaved with the helical anode, since the electron streams are alternately deflected between the sections of this surface and the turns of the helical anode.

While I have described what I at present consider to be the preferred embodiments of my invention, it will, of course, be understood that I do not wish to be limited thereto, since many modifications in structure of the electron discharge device disclosed and of the circuits employed may be made, and I contemplate by the appended claims to cover all such modifications as fall within the true spirit and scope of my invention.

What is claimed is:

1. A frequency conversion system comprising, an electron discharge device including a pair of anodes, each of said anodes comprising a plurality of sections, the sections of one anode being disposed adjacent to the sections of the other anode, a control electrode, and a cathode for emitting electrons to said anodes, means including said control electrode for separating said electrons into a plurality of streams, each of said streams dividing between a section of one anode and an adjacent section of the other anode, an output circuit coupled to said anodes, two alternating voltage sources, one of said voltages having a frequency different from the frequency of the other voltage, means for alternately deflecting each of said streams toward one and then the other of its respective adjacent anode sections at the frequency of one of said voltages, without affecting the total electron emission to said anodes, to vary the division of current between said anodes thereby to produce current variations in said output circuit at said frequency, and means including said control electrode for varying the total electron emission to said anodes at the frequency of the other of said voltages to modulate said current variations in said output circuit at said other frequency.

2. A frequency conversion system comprising, an electron discharge device including a pair of anodes, each of said anodes comprising a plurality of sections, the sections of one anode being disposed adjacent to the sections of the other anode, a first control electrode, a pair of additional electrodes, and a cathode for emitting electrons to said anodes, means including said additional electrodes for separating said electrons into a plurality of streams, each of said streams dividing between a section of one anode and an adjacent section of the other anode, an output circuit coupled to said anodes, a first source of alternating voltage coupled between said additional electrodes for alternately deflecting each of said streams toward one and then the other of its respective adjacent anode sections at the frequency of said first source to vary the division of current between said anodes thereby to produce current variations in said output circuit at said frequency, and a second source of alternating voltage coupled to said control electrode for varying the total electron emission to said anodes at the frequency of said second source thereby to modulate said current variations in said output circuit at said last named frequency.

3. A frequency conversion system comprising, an electron discharge device including a pair of anodes, each of said anodes comprising a plurality of sections, the sections of one anode being disposed adjacent to the sections of the other anode, a first control electrode, a pair of additional electrodes, and a cathode for emitting electrons to said anodes, means including said additional electrodes for separating said electrons into a plurality of streams, each of said streams dividing between a section of one anode and an adjacent section of the other anode, an output circuit coupled to said anodes, a first source of alternating voltage coupled between said additional electrodes for alternately deflecting each of said streams toward one and then the other of its respective adjacent sections at the frequency of said first source to vary the division of current between said anodes thereby to produce current variations in said output circuit at said frequency, and a second source of alternating voltage having a different frequency from said first source, said second source being coupled to said control electrode to vary the total electron emission to said anodes at the frequency of said second source thereby to modulate said current variations at the frequency of said second source.

4. A frequency conversion system comprising, an electron discharge device including a pair of anodes, each of said anodes comprising a plurality of sections, the sections of one anode being disposed adjacent to the sections of the other anode, a first control electrode, a pair of additional electrodes, and a cathode for emitting electrons to said anodes, means including said additional electrodes for separating said electrons into a plurality of streams, each of said streams dividing between a section of one anode and an adjacent section of the other anode, an output circuit coupled to said anodes, a first source of alternating voltage coupled between said additional electrodes for alternately deflecting each of said streams toward one and then the other of its respective adjacent sections at the frequency of said first source to vary the division of current between said anodes thereby to produce current variations in said output circuit at said frequency, a second source of alternating voltage coupled to said control electrode for varying the total electron emission to said anodes at the frequency of said second source thereby to modulate said current variations at said last named frequency, and means for deriving from said output circuit a voltage having only one of the frequency components of modulation therein.

5. In combination, an electron discharge device including a pair of anodes, each of said anodes comprising a plurality of sections, the sections of one anode being disposed adjacent to the sections of the other anode, a cathode for emitting electrons to said anodes, and a pair of control electrodes unsymmetrically disposed with respect to said cathode, means including said control electrodes for separating said electrons into a plurality of streams, each of said streams dividing between a section of one anode and an adjacent section of the other anode, an output circuit coupled to said anodes, a first source of alternating voltage, coupling means for impressing said voltage between said control electrodes alternately to deflect each of said streams toward one and then the other of its respective adjacent anode sections at the frequency of said first source thereby to vary the division of current between said anodes and to produce current variations in said output circuit at said frequency, a second source of alternating voltage, and coupling means for impressing said second voltage on said control electrodes to vary the total electron emission to said anodes at the frequency of said second voltage thereby to modulate said current variations at said last named frequency, said coupling means being proportioned so that the voltage impressed on the control electrodes to vary the total electron emission to the anodes does not affect the deflection of the electron streams between the sections of the two anodes.

6. A frequency conversion system comprising, an electron discharge device including a cathode, a control electrode and a pair of anodes, each of said anodes comprising a plurality of sections, the sections of one anode being disposed adjacent to the sections of the other anode, an output circuit including connections to each of said anodes and a common connection to said cathode, two alternating voltage sources, means for impressing one of said voltages between said control electrode and said cathode thereby to produce variations in the current in said output circuit at the frequency of said impressed voltage, and means for impressing the other of said voltages between said anodes thereby to separate the electron stream from said cathode into a plurality of streams and to modulate said current variations at the frequency of said other voltage.

7. A frequency conversion system comprising, an electron discharge device including a pair of anodes, each of said anodes comprising a plurality of sections, the sections of one anode being disposed adjacent to the sections of the other anode, a cathode for emitting electrons to said anodes, and a control electrode, means including said control electrode for separating said electrons into a plurality of streams, each of said streams dividing between a section of one anode and an adjacent section of the other anode, an output circuit coupled to said anodes, two alternating voltage sources, means for impressing one of said voltages between said anodes alternately to deflect each of said streams toward one and then the other of its respective adjacent anode sections at the frequency of said impressed voltage thereby to vary the division of current between said anodes and to produce current variations in said output circuit at said frequency, and means for impressing the other of said voltages on said control electrode to vary the total electron emission to said anodes at the frequency of the other voltage to modulate said current variations at said last named frequency.

8. In combination, an electron discharge device including a pair of anodes, each of said anodes comprising a plurality of sections, the sections of one anode being disposed adjacent the sections of the other anode, a cathode for emitting electrons to said anodes, means for separating said electrons into a plurality of streams, each of said streams dividing between a section of one anode and an adjacent section of the other anode, two alternating voltage sources, means for alternately deflecting each of said streams towards one and then the other of its respective adjacent anode sections at the frequency of one of said voltages to produce variations in the division of current between said anodes, means for varying the total electron current to said anodes at the frequency of the other of said voltages, whereby the individual anode currents vary at heterodyne frequencies, and means comprising an output circuit connected directly between said anodes for deriving heterodyne-frequency potentials from the system.

9. In combination, an electron discharge device including a pair of anodes, each of said anodes comprising a plurality of sections, the sections of one anode being disposed adjacent the sections of the other anode, a cathode for emitting electrons to said anodes, means for separating said electrons into a plurality of streams, each of said streams dividing between a section of one anode and an adjacent section of the other anode, two alternating voltage sources, means for alternately deflecting each of said streams towards one and then the other of its respective adjacent anode sections at the frequency of one of said voltages, without affecting the electron emission to said anodes, to produce variations in the division of current between said anodes, means for varying the total electron current to said anodes at the frequency of the other of said voltages, whereby the individual anode currents vary at heterodyne frequencies, and means comprising an output circuit connected directly between said anodes for deriving heterodyne-frequency potentials from the system.

10. In combination, an electron discharge device including a pair of anodes, each of said anodes comprising a plurality of sections, the sections of one anode being disposed adjacent the sections of the other anode, a cathode for emitting electrons to said anodes, means for separating said electrons into a plurality of streams, each of said streams dividing between a section of one anode and an adjacent section of the other anode, two alternating voltage sources, one of said voltages having a frequency different from the frequency of the other of said voltages, means for alternately deflecting each of said streams towards one and then the other of its respective adjacent anode sections at the frequency of one of said voltages to produce variations in the division of current between said anodes, means for varying the total electron current to said anodes at the frequency of the other of said voltages, whereby the individual anode currents vary at heterodyne frequencies, and means comprising an output circuit connected directly between said anodes for deriving heterodyne-frequency potentials from the system.

11. In combination, an electron discharge device including a pair of anodes, each of said anodes comprising a plurality of sections, the sections of one anode being disposed adjacent the sections of the other anode, a cathode for emitting electrons to said anodes, means for separating said electrons into a plurality of streams, each of said streams dividing between a section of one anode and an adjacent section of the other anode, two alternating voltage sources, one of said voltages having a frequency different from the frequency of the other of said voltages, means for alternately deflecting each of said streams towards one and then the other of its respective adjacent anode sections at the frequency of one of said voltages, without affecting the electron current to said anodes, to produce variations in the division of current between said anodes, means for varying the total electron current to said anodes at the frequency of the other of said voltages, whereby the individual anode currents vary at heterodyne frequencies, and means comprising an output circuit connected directly between said anodes for deriving a voltage having only one of the heterodyne-frequency components therein.

12. In combination, an electron discharge device including a pair of anodes, each of said anodes comprising a plurality of sections, the sections of one anode being disposed adjacent the sections of the other anode, a cathode for emitting electrons to said anodes, means for separating said electrons into a plurality of streams, each of said streams dividing between a section of one anode and an adjacent section of the other anode, an output circuit connected between said anodes, two alternating voltage sources, one of said sources comprising an adjustable resonant circuit, means for exciting said resonant circuit by an alternating voltage derived from said output circuit, means for alternately deflecting each of said electron streams towards one and then the other of its respective adjacent anode sections at the frequency of the other of said voltages to vary the division of current between said anodes at said frequency, and means for varying the total electron current to said anodes at the natural frequency of said resonant circuit whereby the individual anode currents vary at heterodyne frequencies, said output circuit including means for deriving heterodyne-frequency potentials from the system.

13. In combination, an electron discharge device including a pair of anodes, each of said anodes comprising a plurality of sections, the sections of one anode being disposed adjacent to the sections of the other anode, a cathode for emitting electrons to said anodes, means for separating said electrons into a plurality of streams, each of said streams dividing between a section of one anode and an adjacent section of the other anode, an output circuit connected between said anodes, an alternating voltage source, an adjustable resonant circuit, a feedback path coupled between said output circuit and said resonant circuit, means for alternately deflecting each of said electron streams towards one and then the other of its respective adjacent anode sections at the frequency of said source to vary the division of current between said anodes at said frequency, and means for varying the total electron current to said anodes at the natural frequency of said resonant circuit, whereby the individual anode currents vary at heterodyne frequencies, said output circuit including means for deriving heterodyne-frequency potentials from the system.

14. A frequency conversion system comprising an electron discharge device including a pair of anodes, each of said anodes including a plurality of sections alternating with and closely spaced with respect to each other, a cathode for emitting electrons to said anodes, means for separating said electrons into a plurality of streams, each of said streams dividing between a section of one anode and an adjacent section of the other anode, an output circuit connected between said anodes, two alternating voltage sources, means for alternately deflecting each of said streams towards one and then the other of its respective adjacent anode sections at the frequency of one of said voltages to vary the division of current between said anodes, and means for varying the total electron current to said anodes at the frequency of the other of said voltages, whereby the individual anode currents vary at heterodyne frequencies, said output circuit including means for deriving heterodyne-frequency voltages from the system.

15. A frequency conversion system comprising an electron discharge device including a pair of anodes, each of said anodes including a plurality of sections alternating with and closely spaced with respect to each other, a cathode for emitting electrons to said anodes, means for separating said electrons into a plurality of streams, each of said streams dividing between a section of one anode and an adjacent section of the other anode, an output circuit connected directly between said anodes, two alternating voltage sources, means for alternately deflecting each of said streams towards one and then the other of its respective adjacent anode sections at the frequency of one of said voltages to vary the division of current between said anodes, and means for varying the total electron current to said anodes at the frequency of the other of said voltages, whereby the individual anode currents vary at heterodyne frequencies, said output circuit including means for deriving a voltage having only one of the heterodyne-frequency components therein.

16. A frequency conversion system comprising an electron discharge device including a pair of interleaved anodes, each of said anodes including a plurality of sections alternating with and closely spaced with respect to each other, a cathode for emitting electrons to said anodes, means for separating said electrons into a plurality of streams, each of said streams dividing between a section of one anode and an adjacent section of the other anode, an output circuit coupled directly between said anodes, two alternating voltage sources, means for alternately deflecting each of said streams towards one and then the other of its respective adjacent anode sections at the frequency of one of said voltages, and means for varying the total electron current to said anodes at the frequency of the other of said voltages, whereby the individual anode currents vary at heterodyne frequencies, said output circuit including means for deriving heterodyne-frequency voltages from the system.

17. A frequency conversion system comprising an electron discharge device including a pair of interleaved anodes, each of said anodes including a plurality of sections alternating with and closely spaced with respect to each other, a cathode for emitting electrons to said anodes, means for separating said electrons into a plurality of streams, each of said streams dividing between a section of one anode and an adjacent section of the other anode, an output circuit connected directly between said anodes, two alternating voltage sources, means for alternately deflecting each of said streams towards one and then the other of its respective adjacent anode sections at the frequency of one of said voltages to vary the division of current between said anodes, and means for varying the total electron current to said anodes at the frequency of the other of said voltages, whereby the individual anode currents vary at heterodyne frequencies, said output circuit including means for deriving a voltage having only one of the heterodyne-frequency components therein.

LOUIS A. HAZELTINE.